(12) United States Patent
Larghi

(10) Patent No.: US 6,657,976 B1
(45) Date of Patent: Dec. 2, 2003

(54) SYSTEM AND METHOD FOR CONTROLLING TRANSMITTER POWER OF A NARROWBAND ADVANCED MESSAGING SYSTEM

(75) Inventor: Stephen Larghi, Keller, TX (US)

(73) Assignee: WebLink Wireless, Inc., Dallas, TX (US)

( * ) Notice: Subject to any disclaimer, the term of this patent is extended or adjusted under 35 U.S.C. 154(b) by 0 days.

(21) Appl. No.: 09/387,470

(22) Filed: Sep. 1, 1999

Related U.S. Application Data (60) Provisional application No. 60/098,873, filed on Sep. 1, 1998.

(51) Int. Cl.[7] .............................................. H04B 7/005
(52) U.S. Cl. ...................................... 370/278; 455/522
(58) Field of Search ................................ 370/252, 311, 370/332, 334, 278; 455/69, 522

(56) References Cited

U.S. PATENT DOCUMENTS

| | | | | |
|---|---|---|---|---|
| 5,303,240 A | * | 4/1994 | Borras et al. ................ | 342/368 |
| 5,491,837 A | * | 2/1996 | Haartsen ...................... | 370/337 |
| 5,604,730 A | * | 2/1997 | Tiedemann, Jr. ............. | 370/252 |
| 5,701,583 A | * | 12/1997 | Harbin et al. ................. | 455/25 |
| 5,818,820 A | * | 10/1998 | Anderson et al. ........... | 370/280 |
| 5,839,056 A | * | 11/1998 | Hakkinen ..................... | 455/69 |
| 5,844,522 A | * | 12/1998 | Sheffer et al. ............... | 342/457 |
| 5,930,684 A | * | 7/1999 | Keskitalo et al. ............. | 455/69 |
| 5,940,741 A | * | 8/1999 | Briancon et al. ............ | 455/31.3 |
| 6,097,970 A | * | 8/2000 | Angus et al. ................ | 455/562 |
| 6,285,664 B1 | * | 9/2001 | Bernstein et al. ........... | 370/318 |
| 6,295,289 B1 | * | 9/2001 | Ionescu et al. ............. | 370/342 |
| 6,442,397 B1 | * | 8/2002 | Benveniste .................. | 455/522 |

* cited by examiner

*Primary Examiner*—Chau Nguyen
*Assistant Examiner*—Jasper Kwoh (57) ABSTRACT

A reverse channel power controller for use in a narrowband wireless messaging network containing a plurality of base stations that communicate with subscriber communication devices. The reverse channel power controller controls the transmission power of the subscriber communication devices. The reverse channel power controller contains: 1) a reverse channel traffic determination circuit for determining a level of reverse channel traffic received by a selected one of the plurality of base stations; and 2) a communication controller for transmitting to the selected subscriber communication device a power control command capable of causing the selected subscriber communication device to adjust a power level of a reverse channel signal transmitted by the selected subscriber communication device.

17 Claims, 5 Drawing Sheets

SYSTEM AND METHOD FOR CONTROLLING TRANSMITTER POWER OF A NARROWBAND ADVANCED MESSAGING SYSTEM

CROSS-REFERENCE TO RELATED APPLICATIONS

The present invention is related to those disclosed in the following U.S. patent applications:

1. Ser. No. 09/002,191, filed Dec. 31, 1997, entitled "ANTENNA SYSTEM FOR NARROWBAND COMMUNICATIONS SYSTEMS AND METHOD OF OPERATION" now U.S. Pat. No. 6,097,970;
2. Ser. No. 09/001,717, filed Dec. 31, 1997, entitled "CONTROLLER FOR USE WITH COMMUNICATIONS SYSTEMS FOR CONVERTING A VOICE MESSAGE TO A TEXT MESSAGE" now U.S. Pat. No. 6,198,808;
3. Ser. No. 09/001,759, filed Dec. 31, 1997, entitled "SYSTEM FOR SCHEDULING REVERSE-CHANNEL MESSAGES IN NARROWBAND COMMUNICATIONS SYSTEMS AND METHODS OF OPERATION" now U.S. Pat. No. 6,097,969;
4. Ser. No. 09/138,438, filed Aug. 21, 1998, entitled "SYSTEM AND METHOD FOR MODELING SIMULCAST DELAY SPREAD AND OPTIMIZING LAUNCH DELAYS" now U.S. Pat. No. 6,097,930;
5. Provisional Serial No. 60/098,873, filed Sep. 1, 1998, entitled "NARROWBAND TELEMETRY SYSTEM AND METHODS OF OPERATION";
6. Ser. No. 09/387,480, filed concurrently herewith, entitled "SYSTEM AND METHOD FOR CONTROLLING AN END-USER APPLICATION AMONG A PLURALITY OF COMMUNICATION UNITS IN A WIRELESS MESSAGING NETWORK";
7. Ser. No. 09/388,255, filed concurrently herewith, entitled "SYSTEM AND METHOD FOR TRANSMITTING SUBSCRIBER DATA IN A NARROWBAND ADVANCED MESSAGING SYSTEM USING UNSCHEDULED MESSAGE TIME SLOTS" now abandoned ; and
8. Ser. No. 09/387,463, filed concurrently herewith, entitled "SYSTEM AND METHOD FOR OVER-THE-AIR REPROGRAMMING OF AN ADVANCED WIRELESS MESSAGING DEVICE" now abandoned.

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless communication systems and methods of operating the same and, in particular, to systems and methods for controlling the transmitter power of an advance wireless messaging device in a narrowband wireless messaging network.

BACKGROUND OF THE INVENTION

The demand for better and cheaper wireless communication services and equipment continues to grow at a rapid pace. Much of this growth is spurred by the Federal Communication Commission's ("FCC") approval of certain frequency bands for the next generation of Personal Communication Service ("PCS") devices that provide advanced voice and/or data messaging services, as well as voice telephone services. A relatively small portion of the available frequency bands was set aside for narrowband PCS ("NPCS") to encourage efficient use of the available spectrum. There are a number of well-known wireless communication techniques that attempt to maximize the efficiency with which the available spectrum is used. These methods include frequency division multiple access ("FDMA"), time division multiple access ("TDMA"), code division multiple access ("CDMA"), and the like. The term "multiple access" means that multiple subscribers (or users) are able to communicate simultaneously with each of these systems.

In general, the infrastructure of a messaging system is somewhat different than cellular telephone systems. For instance, in a NPCS messaging system, all of the base station transmitters throughout a wide coverage area are synchronized and simultaneously broadcast (i.e., simulcast) a message in a forward-channel to a wireless subscriber communication unit (e.g., portable message pagers, fixed messaging or telemetry devices, etc.). This simulcast increases the likelihood that the transmitted message will reach the device even through obstacles, such as buildings, trees, overpasses, and the like. Likewise, the subscriber communication units are capable of transmitting messages in a reverse-channel to numerous receivers associated with the base stations. However, the messaging system does not assign the subscriber to a particular cell and does not transmit to the subscriber only in one cell, as in the case of a cellular telephone system.

Telemetry systems, broadly stated, are communication systems that transmit "status" information from a remote process, function, or device (collectively, "telemetry application") to a central control facility. Telemetry systems may be used in lieu of maintenance workers to remotely monitor a given telemetry application, such as a utility meter, security system, vehicle locator, environmental monitor, vending machine, medical equipment, oil drilling equipment, and the like.

In many wireless messaging systems, particularly telemetry systems, it is crucial that data be transmitted to and received from the subscriber wireless messaging device in a reliable manner. However, a wireless messaging device often fails to receive an incoming message the first time it is transmitted to the wireless messaging device. Similarly, a base station often fails to receive an incoming message from a wireless messaging device the first time the wireless messaging device transmits it. When the transmitting device does not receive an acknowledgment (ACK BACK) message, the solution is to retransmit the message from the base station (or the subscriber wireless messaging device) until it is finally received at the destination.

Unfortunately, the retransmission process is time consuming. This is detrimental to data systems, particularly telemetry devices, that rely on wireless messaging to transmit and/or receive, for example, alarms, warning messages, critical measurements or operating. parameters, and the like. Frequently, transmitted messages are missed because of a high level of data traffic "noise" in the operating frequencies of the base station and/or the wireless. messaging device. For example, during certain busy times of day, there may be so much data traffic transmitted to a base station that an ACK BACK message from a subscriber wireless messaging device may not be received. Similarly, if the subscriber wireless messaging device initiates a transmission, such as in a two-way messaging. system, the base station may not receive the message if the level of data traffic from other subscriber wireless messaging devices is high. This is particularly true if the subscriber wireless messaging device is remote from the base station.

Therefore, there exists a need in the art for improved wireless messaging networks that can deliver wireless messages during periods of high data traffic. More particularly, there is a need in the art for wireless messaging systems that can transmit messages to a base station from a subscriber wireless messaging device with a high degree of reliability and with a minimum number of message re-transmissions.

SUMMARY OF THE INVENTION

To address the above-discussed deficiencies of the prior art, it is a primary object of the present invention to provide a reverse channel power controller for use in a narrowband wireless messaging network comprising a plurality of base stations capable of communicating with a plurality of subscriber communication devices. The reverse channel power controller controls a transmission power of a selected one of the plurality of subscriber communication devices. In an advantageous embodiment of the present invention, the reverse channel power controller comprises: 1) a reverse channel traffic determination circuit for determining a level of reverse channel traffic received by a selected one of the plurality of base stations; and 2) a communication controller for transmitting to the selected subscriber communication device a power control command capable of causing the selected subscriber communication device to adjust a power level of a reverse channel signal transmitted by the selected subscriber communication device.

In one embodiment of the present invention, the reverse channel power controller further comprises detection means for detecting a status signal intermittently transmitted by the selected subscriber communication device.

In another embodiment of the present invention, the communication controller transmits the power control command to the selected subscriber communication device if the status signal is not detected by the detection means.

In still another embodiment of the present invention, the communication controller transmits the power control command to the selected subscriber communication device if a power level of the status signal detected by the detection means is low.

In yet another embodiment of the present invention, the reverse channel traffic determination circuit determines the level of reverse channel traffic received by the selected base station by monitoring at least one received signal strength indicator (RSSI) data associated with the selected base station.

In a further embodiment of the present invention, the reverse channel traffic determination circuit determines the level of reverse channel traffic received by the selected base station by using reverse channel traffic pattern data stored in a memory associated with the reverse channel power controller.

In a still further embodiment of the present invention, at least one of the reverse channel traffic pattern data is associated with a selected time of day.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device, may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless messaging network.

Figure 1:
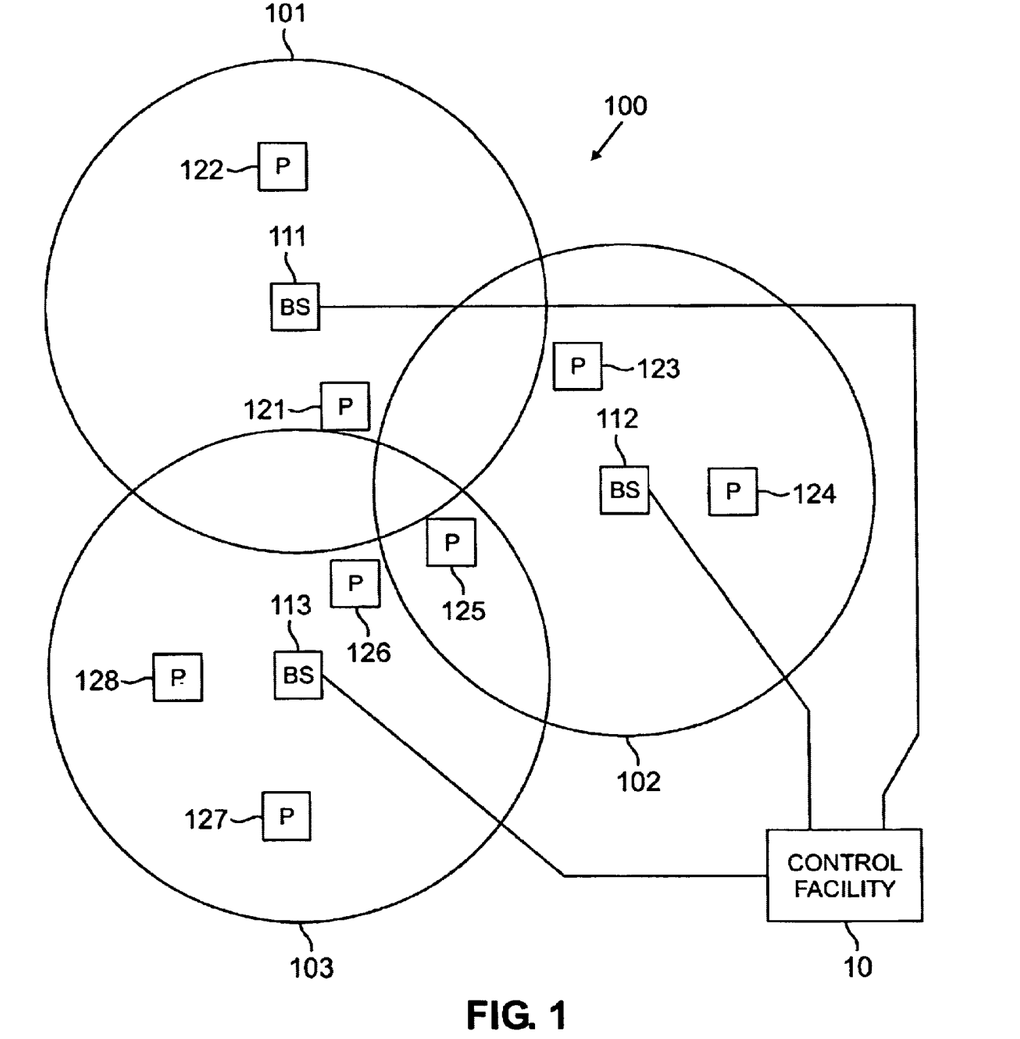
FIG. 1 illustrates a representative portion of an exemplary messaging network in one embodiment of the present invention.

Turning initially to FIG. 1, there is illustrated a representative portion of a conventional messaging network (generally designated "100" and referred to below as "network 100"). Network 100 provides two-way data messages to subscribers (or users) of network 100. Network 100 is represented by three exemplary fixed land sites, called base stations, which communicate with a plurality of subscriber communication units 121–128 (e.g., message pagers, telemetry devices, PCS devices, personal data assistants, or other processing systems that include wireless communication capability, etc.) within network 100.

Base stations 111, 112 and 113, each labeled "BS" in FIG. 1, have coverage areas 101, 102, and 103, respectively, that are determined by the power of the transmitters in base stations 111–113 and by the characteristics of their associated antennas. For the purposes of illustration and discussion, coverage areas 101, 102, and 103 are shown as circles. In real world environments, however, each of coverage areas 101, 102, and 103 may differ significantly from an idealized circular form.

For purposes of illustration, a plurality of subscriber communication units, each labeled "P" in FIG. 1, are shown scattered throughout messaging network 100. Subscriber communication units 121 and 122 are located within coverage area 101 and may engage in two-way messaging with base station 111. Subscriber communication units 123 and 124 are located in coverage area 102 and may engage in two-way messaging with base station 112. Subscriber communication units 126, 127 and 128 are located in coverage area 103 and may engage in two-way messaging with base station 113. Subscriber communication unit 125 is located in coverage areas 102 and 103 and may engage in two-way messaging with base stations 112 and 113.

In a NPCS environment, base stations 111, 112, and 113 transmit signals in a forward-channel, such as from 939–940 MHZ, for example. Base stations 111, 112, and 113 receive signals in a reverse-channel at, for example, 901–902 MHZ. Each base station is effectively a transceiver that contains a transmitter and a receiver for carrying out two-way communications. Each subscriber communication unit receives forward-channel messages directed to it at a selected frequency within the forward-channel. Each subscriber, communication unit also transmits reverse-channel messages at a selected frequency within the reverse-channel.

Messaging network 100 may be, for example, a two-way wireless messaging system compatible with the MOTOROLA® ReFLEX™ transport protocol. The ReFLEX™ protocol may be used to send a message to a subscriber communication unit. The subscriber communication unit may then transmit in the reverse-channel an automatic acknowledgment message that does not require subscriber action. Alternatively, the ReFLEX™ protocol may be used in an enhanced messaging mode to, send a more complex message to the subscriber communication unit. The subscriber communication unit may then transmit in the reverse-channel an automatic acknowledgment message that does not require subscriber action. Some time later, the subscriber may transmit a "canned" message stored in the subscriber communication unit, such as "Will Call You Later", or a unique message composed by the subscriber using a keypad on the subscriber communication unit.

Base station ill transmits messages to subscriber communication units in coverage area 101. Base station 112 transmits messages to subscriber communication units in coverage area 102. Base station 113 transmits messages to subscriber communication units in coverage area 103. Base stations 111, 112, and 113 may be associated with one another and with a control facility 10 by a wired backbone, such as a proprietary fiber-optic network. In alternate embodiments, base stations 111, 112, and 113 may be associated with one another and with control facility 10 by a satellite communications link, such as through a very small aperture terminal ("VSAT").

It should be noted that while the illustrated embodiment discloses centralized control facility 10 for controlling communication among the exemplary subscriber communication units, in alternate advantageous embodiments communications control may be distributed. It should also be noted that messages may be received into control facility 10 from a variety of sources. Some messages may be received from a public telephone system in the form of simple call-back numbers entered by a caller on a DTMF keypad. Other messages may be received by control facility 10 from an Internet connection. Additionally, and most importantly in the context of the present invention, messages may be received from subscriber communication units, such as telemetry devices in the field.

Figure 2:
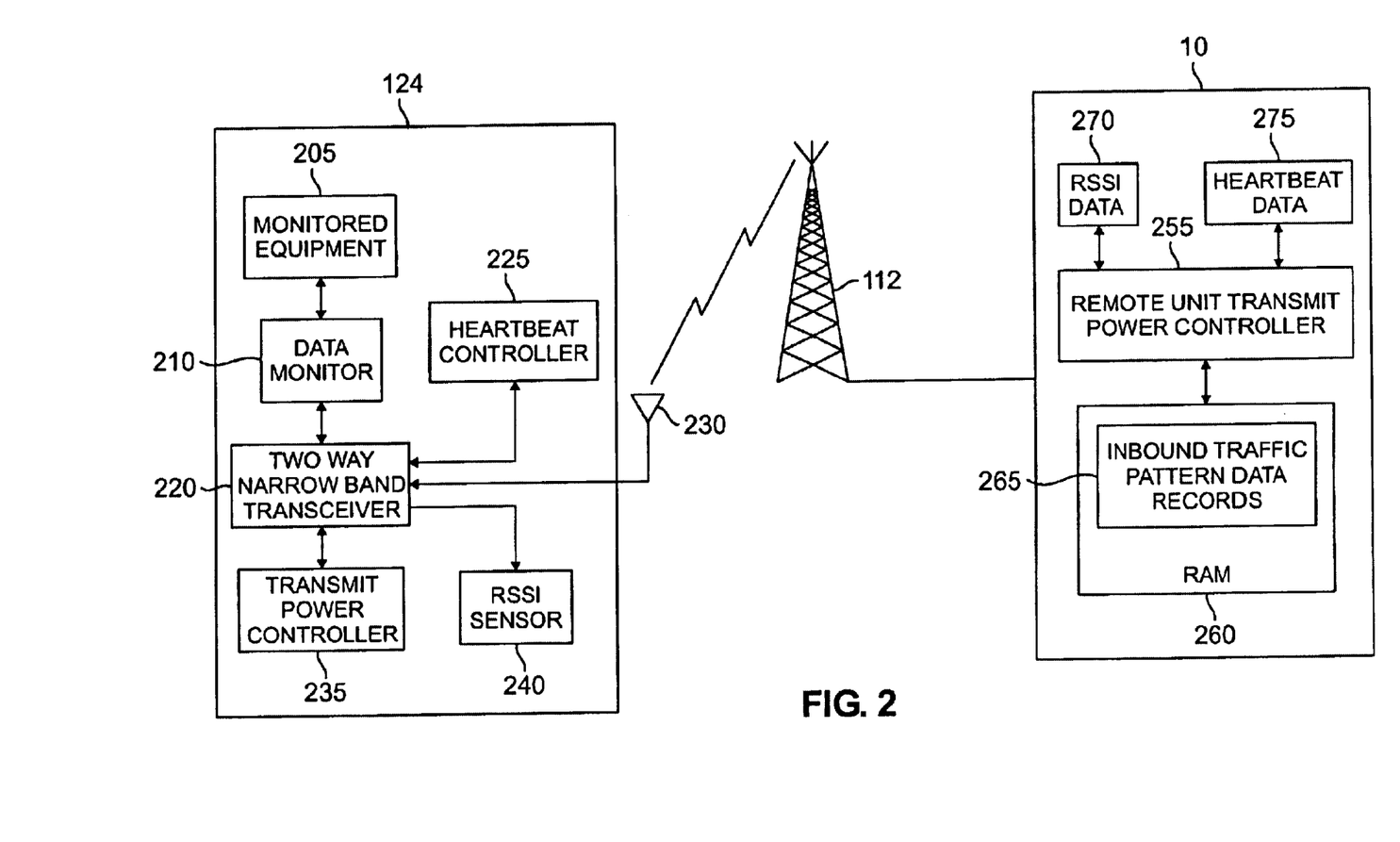
FIG. 2 illustrates a block diagram of an exemplary one of the subscriber communication units for use in the network in FIG. 1 in one embodiment of the present invention.

Turning to FIG. 2, there is illustrated a block diagram of an exemplary one of subscriber communication units 121–128 for use in network 100. Exemplary subscriber communication unit 124 is "fixed," which is defined broadly, meaning statically associated with a location, a device, a vehicle, or other tangible object. Exemplary subscriber communication unit 124 transfers communications through local antenna 230 for reception by control facility 10 through at least one base station, such as, for example, base station 112. Subscriber communication unit 124 comprises monitored equipment 205, data monitor 210, two-way narrow band transceiver 220, heartbeat controller 225, transmit power controller 235, and received signal strength indicator (RSSI) sensor 240.

Monitored equipment 205 represents any type of equipment or system which may interface with exemplary subscriber communication unit 124 for the purpose of transferring operational status and/or measurements to remotely located control facility 10. Monitored equipment 205 and subscriber communication unit 124 may be parts of an integrated unit. Alternatively, monitored equipment 205 may be located external to subscriber communication unit 124 and provide status information and measurements to subscriber communication unit (SCU) 124. In some embodiments of the present invention, monitored equipment 205 may respond to "ping" message that is received from base station 112. A ping message is a message intermittently transmitted by control facility 10 to request the status of monitored equipment 205. A positive response by monitored equipment 205 indicates that monitored equipment 205 is still functioning.

Data monitor 210 monitors and/or measures operating parameters and status information in monitored equipment 205 and transfers this information (i.e., telemetry data) to control facility 10 through antenna 230 and base station 112. The telemetry data recorded by data monitor 210 and/or monitored equipment 205 may include parameters such as ON/OFF status, error conditions, alarms, power, temperature, gas or liquid flow rate, voltage, current, gas or liquid pressure, weight, inventory count, speed, acceleration, or virtually any other physical parameter that may be measured or recorded. Further, data monitor 210 stores the telemetry data and transfers it as required to two-way narrow band transceiver 220.

Exemplary two-way narrow band transceiver 220 transmits data. received from data monitor 210, heartbeat controller 225, and transmit power controller 235 to base station 112 and transfers to these devices data received from base station 112. In some embodiments of the present invention, two-way narrow band transceiver 220 may provide. a received signal strength indicator (RSSI) signal to optional RSSI sensor 240.

Heartbeat controller 225 generates intermittent status messages that are transmitted in the reverse channel by SCU 124. When a pre-determined elapsed time has expired without transmission of a reverse channel message, heartbeat controller 225 may send a status message to two-way narrow band, transceiver 220, causing the transmission of a "heartbeat" signal to bases station 112 indicating that SCU 124 is properly functioning.

Antenna 230 provides the means for transferring forward and reverse channel messages between SCU 124 and base station 112, as well as any other responding base stations in the absence of 20 communications from base station 112.

Transmit power controller 235 monitors forward channel control information from two-way narrow band transceiver 220 to determine if a power control command has been received for the purpose of increasing or decreasing the output power level of SCU 124. Transmit power controller 235 may also-receive a RSSI signal status message from RSSI sensor 240 which indicates the power level of reverse channel signals measured by RSSI sensor 240. Depending upon the levels of reverse channel signals and/or the presence of a power control command, transmit power controller 235 may cause two-way narrow band transceiver 220 to adjusting the output power of the reverse channel signal.

In one embodiment of the present invention, transmit power controller 235 may increase or decrease the reverse channel power in incremental steps not to exceed a predetermined maximum or minimum total output power level. In another embodiment, transmit power controller 235 may determine the current time from an internal clock and increase or decrease the transmitted power level to predetermined levels based upon the time of day. In still another embodiment, transmit power controller 235 may increase the transmitted power level for high priority or urgent messages. For example, transmit power controller 235 may transmit a fire alarm message at a higher power level.

Exemplary control facility 10 comprises remote unit transmit power controller 255, random access memory (RAM) 260, RSSI data record 270, and heartbeat data record 275. RAM 260 contains in-bound traffic pattern data records 265. Remote unit transmit power controller 255 monitors the power level of reverse channel signals using RSSI data received from base station 112 and stored in RSSI data record 270. Remote unit transmit power controller 255 determines when the power level in the reverse channel is outside of a pre-determined tolerance level and may transmit a power control command to SCU 124 when the reverse channel power level is out of tolerance. Remote unit transmit power controller 255 also may retrieve known reverse channel traffic pattern data from in-bound traffic pattern data records 265 that corresponds to the current time-of-day. If remote unit transmit power controller 255 determines that the traffic level is high for the current time-of-day, remote unit transmit power controller 255 may transmit a power control command to SCU 124 telling SCU 124 to increase power. Transmit power controller 255 may also transmit a power control command to SCU 124 telling it to lower power when lower traffic periods are experienced.

Additionally, remote unit transmit power controller 255 monitors "heartbeat" messages that are periodically received from SCU 124 and stored in heartbeat data record 275. The heartbeat message includes a time stamp indicating when the heartbeat message was received. If SCU 124 determines that the time period since the last heartbeat message was received exceeds a maximum time period threshold, SCU 124 may transmit a power control command to SCU 124 that causes it to increase its output power.

RSSI data circuit 270 provides the means for determining the reverse channel RSSI level associated with particular subscriber communication units, such as SCU 124, and for providing a corresponding RSSI output for use by remote unit transmit power controller 255. Similarly, heartbeat data circuit 275 provides the means for temporarily storing heartbeat data signals associated with a particular subscriber communication units, such as SCU 124, and for transferring a heartbeat present or absent signal as an interface to remote unit transmit power controller 255. Such reverse channel heartbeat signals are output by subscriber communication units as an indication that the SCU is active in the cell site with no changes occurring during a pre-determined elapsed time since the last reverse channel information was transferred.

It should be noted that the output power level of SCU 124 may be adjusted exclusively by SCU 124 using RSSI data measured by RSSI sensor 240, as described above. Alternatively, the output power level of SCU 124 may be adjusted exclusively by remote unit transmit power controller 255 as described above. Finally, the output power level of SCU 124 may be adjusted cooperatively by facility controller 10 and by SCU 124.

Figure 3:
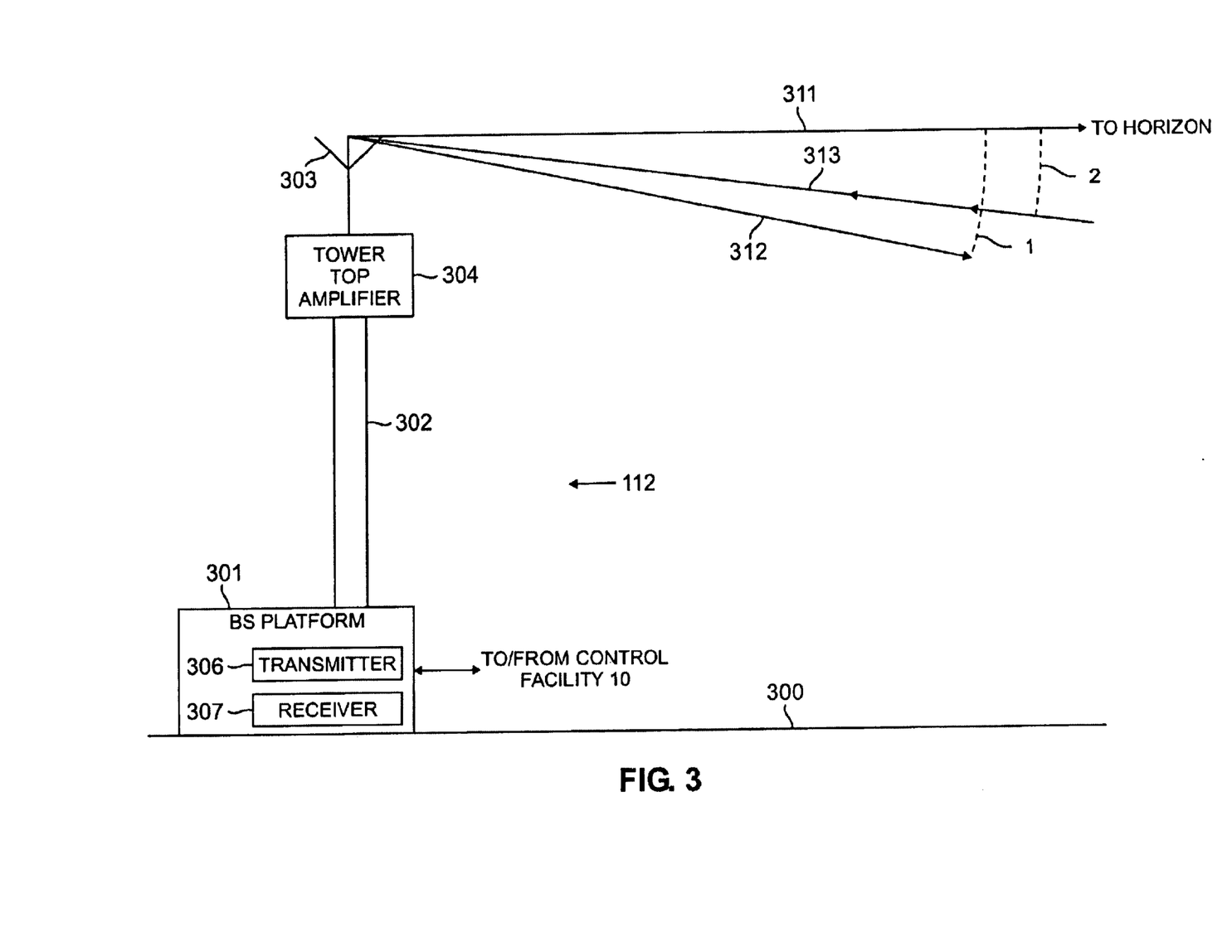
FIG. 3 illustrates forward and reverse-channels associated with base station 112 in one embodiment of the present invention.

In an advantageous embodiment of the present invention, base station 112 has an antenna for transmitting and receiving at different angles of electrical downtilt, as described in U.S. Pat. No. 6,097,970, incorporated by reference above. FIG. 3 illustrates forward and reverse-channels associated with base station 112 in accordance with an exemplary embodiment of the present invention. Base station 112 comprises base station (BS) platform 301 and tower 302 for holding antenna 303 in an elevated position above ground 300. Base station 112 comprises transmitter 306 for transmitting messages in the forward-channel and receiver 307 for receiving messages in the reverse-channel. The forward and reverse-channel messages are appropriately transferred to or from a central control facility 10 (not shown). Tower-top amplifier 304 may optionally be included to strengthen received signals at antenna 303 before transferring the received signals to receiver 307, providing the means for compensating for line losses which occur on long cables between the antenna and the receiver.

Although the remainder of the discussion of the exemplary embodiment focuses on base station 112, it should be noted that this is by way of illustration only, and that the following discussion applies with equal force to the other base stations and receivers in the improved messaging network.

Reference beam 311 is a horizontal reference axis indicating the relative position of the horizon. Antenna 303 employs electrical downtilt to transmit messages in the forward-channel along transmit beam 312. Transmit beam 312 represents the direction of travel with respect to the horizon of the main power lobe transmitted by antenna 303. As FIG. 3 indicates, transmit beam 312 is transmitted below the horizon at a downtilt angle $\theta 1$. The downtilt angle $\theta 1$ is determined by the electrical characteristics of antenna 303 and is dependent on the transmission frequency of the forward-channel.

Antenna 303 also employs electrical downtilt to receive messages in the reverse channel along receive beam 313. Receive beam 313 represents the direction of travel with respect to the horizon of an incident signal transmitted from a subscriber communication unit located at an optimum distance away from antenna 303. Antenna 303 has been optimized to amplify signals received from subscriber communication units at the optimum distance. The downtilt angle $\theta 2$ is determined by the electrical characteristics of antenna 303 and is dependent on the transmission frequency of the reverse channel.

However, unlike prior art messaging networks, the downtilt angle θ2 of receive beam 313 is above the downtilt angle θ1 of transmit beam 312. Furthermore, in a preferred embodiment of the present invention, the downtilt angle θ2 of receive beam 313 is only slightly below the horizon. In other embodiments of the present invention, the downtilt angle θ2 of receive beam 313 may be oriented directly at the horizon. The use of a smaller angle of electrical downtilt in the reverse channel in antenna 303 focuses antenna 303 on incoming signals from more distant subscriber communication units, including those beyond the boundaries of the forward channel coverage area in which base station 112 resides. This type of antenna pattern optimization increases the probability that antenna 303 will receive reverse-channel signals from remote subscriber communication units in other coverage areas, thereby increasing the overall macro-diversity of the antennas in the network.

The present invention optimizes antenna 303 for the amplification of signals from remote subscriber communication units, and, thereby, maximizes antenna macro-diversity effects, under the assumption that although antenna 303 may occasionally lose the signal from a nearby subscriber communication unit due to blocking or multipath fading, at least one other less close antenna will properly receive the subscriber communication unit's "lost" signal because the less close base station antenna has also been optimized to amplify the signal of remote subscriber communication units. Maximizing the ability of more remote base station receivers to receive the subscriber communication unit's transmissions improves the overall performance of the network.

Figure 4:
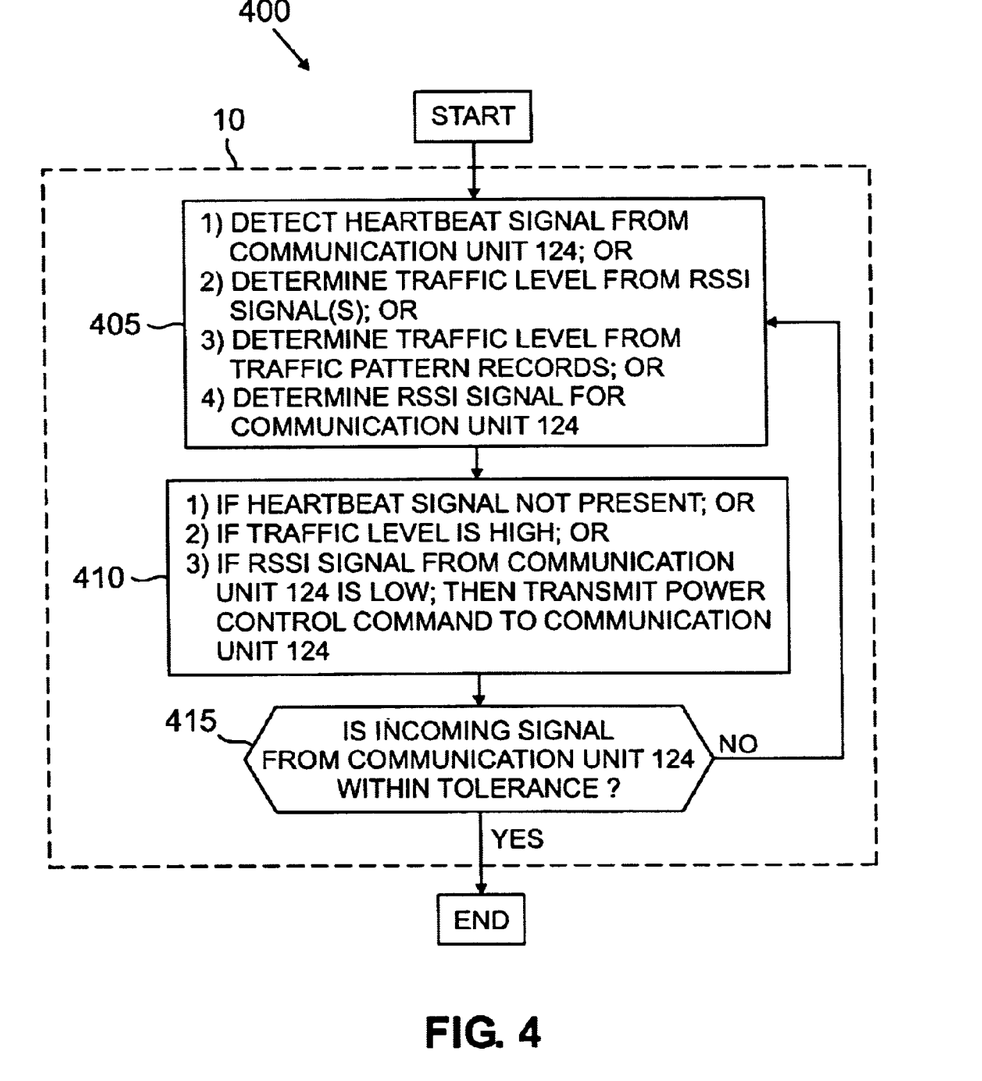
FIG. 4 illustrates a flow diagram of an exemplary control facility in one embodiment of the present invention.

FIG. 4 is flow diagram 400 illustrating the operation of control facility 10 according to one embodiment of the present invention. Remote unit transmit power controller 255 in control facility 10 determines when it is necessary to adjust the power level of SCU 124 by: 1) detecting if a heartbeat signal from SCU 124 has been received in the maximum allowed time period; 2) determining the reverse channel traffic level from measured RSSI signals of all subscriber communication units; 3) determining the reverse channel traffic level for the current time of day using stored traffic pattern data records 265 in RAM 260; and 4) determining the measured RSSI signal for SCU 124 (process step 405).

Next, if 1) the heartbeat signal from SCU 124 is overdue (or not present), or 2) the overall traffic level is too high, or 3) the RSSI signal for SCU 124 is too low, remote unit transmit power controller 255 transmits a power control command to SCU 124 telling it to increase its output power level (process step 410). This process is repeated until the signal received from SCU 124 is sufficiently strong compared to the overall traffic level in the reverse channel (process step 415).

Figure 5:
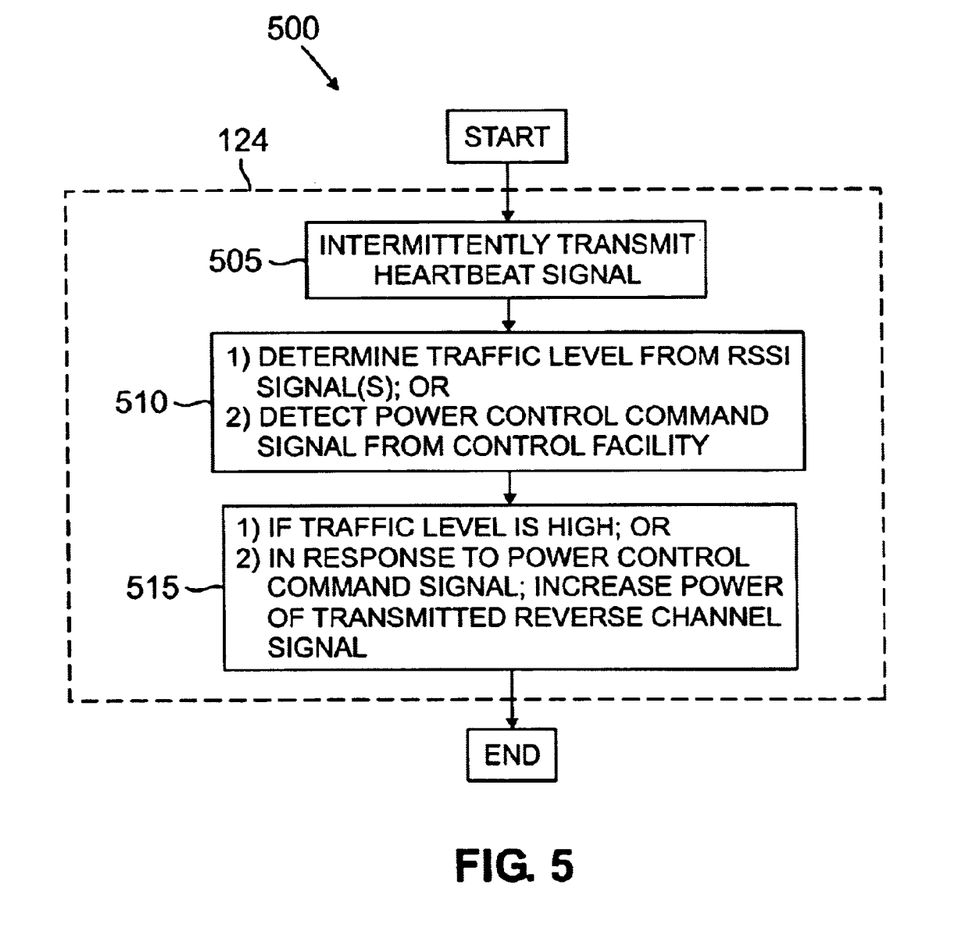
FIG. 5 illustrates a flow diagram of an exemplary subscriber communication unit in one embodiment of the present invention.

FIG. 5 provides a flow diagram representing a preferred embodiment of SCU 124. Exemplary heartbeat controller 225 periodically generates a "heartbeat" message indicating that SCU 124 is active and functioning properly. SCU 124 intermittently transmits the heartbeat signal under the control of heartbeat controller 225 (process step 505). In one embodiment of the present invention, transmit power controller 235 detects a power control command from control facility 10 telling SCU 124 to increase power. In another embodiment of the present invention, RSSI sensor 240 determines that a high level of reverse channel traffic is present (process step 510). If the traffic level is high or the power control command is detected, transmit power controller 235 increases the output power level accordingly (process step 515).

In an advantageous embodiment of the present invention, remote unit transmit power controller 255 may adjust the transmission power of two or more of the subscriber communication units in order to ensure that the received signal strengths from all subscriber communication unit are received at roughly the same power. For example, if remote unit transmit power controller 255 determines that the signal received from SCU 124 is much stronger than the signal received from SCU 123, remote unit transmit power controller 255 1) may command SCU 124 to decrease its transmitted power, or 2) may command SCU 123 to increase its transmitted power, or 3) perform a combination of both.

Those of ordinary skill in the art should appreciate that they can readily use the disclosed conception and specific embodiments as a basis for designing or modifying other structures for carrying out the same purposes of the present invention. Those of ordinary skill in the art should also realize that such equivalent constructions do not depart from the spirit and scope of the present invention in its broadest form.

What is claimed is:

1. For use in a narrowband wireless messaging network comprising a plurality of base stations capable of communicating with a plurality of subscriber communication devices, a reverse channel power controller for controlling a transmission power of a selected one of said plurality of subscriber communication devices comprising:

a reverse channel traffic determination circuit operable to determine an amount of reverse channel traffic received by a selected one of said plurality of base stations, wherein said reverse channel traffic determination circuit determines said amount of reverse channel traffic received by said selected base station by using reverse channel traffic pattern data stored in a memory associated with said reverse channel power controller and wherein at least one of said reverse channel traffic pattern data is associated with a selected time of day; and a communication controller operable to transmit to said selected subscriber communication device a power control command in response to said amount of reverse channel traffic, said power control command capable of causing said selected subscriber communication device to adjust a power level of a reverse channel signal transmitted by said selected subscriber communication device.

2. The reverse channel power controller set forth in claim 1 further comprising a signal detector for detecting a status signal intermittently transmitted by said selected subscriber communication device.

3. The reverse channel power controller set forth in claim 2 wherein said communication controller transmits said power control command to said selected subscriber communication device if said status signal is not detected by said signal detector.

4. The reverse channel power controller set forth in claim 2 wherein said communication controller transmits said power control command to said selected subscriber communication device if a power level of said status signal detected by said signal detector is low.

5. The reverse channel power controller set forth in claim 1 wherein said reverse channel traffic determination circuit further determines said amount of reverse channel traffic received by said selected base station by monitoring at least one received signal strength indicator (RSSI) data associated with said selected base station.

6. The reverse channel power controller set forth in claim 1 wherein a selected one of said plurality of base stations transmits messages to said selected subscriber communication device in a forward channel and receives messages from said selected subscriber communication device in a reverse channel, and wherein an antenna associated with said selected base station transmits said forward-channel messages at a first angle of electrical downtilt below the horizon and receives said reverse-channel messages at a second angle of electrical downtilt, wherein said second angle of electrical downtilt is less than said first angle of electrical downtilt.

7. A narrowband wireless messaging network comprising:
   a plurality of base stations operable to communicate with a plurality of subscriber communication devices; and
   a reverse channel power controller for controlling a transmission power of a selected one of said plurality of subscriber communication devices comprising:
      a reverse channel traffic determination circuit operable to determine an amount of reverse channel traffic received by a selected one of said plurality of base stations, wherein said reverse channel traffic determination circuit determines said amount of reverse channel traffic received by said selected base station by using reverse channel traffic pattern data stored in a memory associated with said reverse channel power controller and wherein at least one of said reverse channel traffic pattern data is associated with a selected time of day; and
      a communication controller operable to transmit to said selected subscriber communication device a power control command in response to said amount of reverse channel traffic, said power control command capable of causing said selected subscriber communication device to adjust a power level of a reverse channel signal transmitted by said selected subscriber communication device.

8. The narrowband wireless messaging network set forth in claim 7 further comprising a signal detector for detecting a status signal intermittently transmitted by said selected subscriber communication device.

9. The narrowband wireless messaging network set forth in claim 8 wherein said communication controller transmits said power control command to said selected subscriber communication device if said status signal is not detected by said signal detector.

10. The narrowband wireless messaging network set forth in claim 8 wherein said communication controller transmits said power control command to said selected subscriber communication device if a power level of said status signal detected by said signal detector is low.

11. The narrowband wireless messaging network set forth in claim 7 wherein said reverse channel traffic determination circuit further determines said amount of reverse channel traffic received by said selected base station by monitoring at least one received signal strength indicator (RSSI) data associated with said selected base station.

12. The narrowband wireless messaging network set forth in claim 7 wherein a selected one of said plurality of base stations transmits messages to said selected subscriber communication device in a forward channel and receives messages from said selected subscriber communication device in a reverse channel, and wherein an antenna associated with said selected base station transmits said forward-channel messages at a first angle of electrical downtilt below the horizon and receives said reverse-channel messages at a second angle of electrical downtilt, wherein said second angle of electrical downtilt is less than said first angle of electrical downtilt.

13. For use in a wireless network comprising a plurality of base stations capable of communicating with a plurality of mobile devices, a method for controlling a transmission power of a selected one of the plurality of subscriber communication devices comprising the steps of:
   determining an amount of reverse channel traffic received by a selected one of the plurality of base stations using reverse channel traffic pattern data stored in a memory wherein at least one of the reverse channel traffic pattern data is associated with a selected time of day; and
   transmitting to the selected subscriber communication device a power control command in response to said amount of reverse channel traffic, said power control command capable of causing the selected subscriber communication device to adjust a power level of a reverse channel signal transmitted by the selected subscriber communication device.

14. The method set forth in claim 13 further comprising the step of detecting a status signal intermittently transmitted by the selected subscriber communication device.

15. The method set forth in claim 14 further comprising the step of transmitting the power control command to the selected subscriber communication device if the status signal is not detected.

16. The method set forth in claim 14 further comprising the step of transmitting the power control command to the selected subscriber communication device if a power level of the detected status signal is low.

17. The method set forth in claim 13 wherein the step of determining further comprises the step of monitoring at least one received signal strength indicator (RSSI) data associated with the selected base station.

* * * * *